United States Patent
Ramadan et al.

(10) Patent No.: US 9,407,853 B2
(45) Date of Patent: Aug. 2, 2016

(54) METHOD FOR PRESENTING WEATHER DATA

(71) Applicant: Vimov, Alexandria (EG)

(72) Inventors: Amr Ramadan, Alexandria (EG); Ahmed Fouad, Al Mahala Al Kobra (EG); Osama Abd El Karim, Alexandria (EG)

(73) Assignee: Vimov (EG)

( * ) Notice: Subject to any disclaimer, the term of this patent is extended or adjusted under 35 U.S.C. 154(b) by 320 days.

(21) Appl. No.: 13/801,792

(22) Filed: Mar. 13, 2013

(65) Prior Publication Data
US 2014/0267912 A1 Sep. 18, 2014

(51) Int. Cl.
G06F 3/00 (2006.01)
H04N 5/445 (2011.01)
H04N 21/4143 (2011.01)
H04N 21/43 (2011.01)
H04N 21/431 (2011.01)
H04N 21/435 (2011.01)
H04N 21/45 (2011.01)
H04N 21/462 (2011.01)
H04N 21/488 (2011.01)
H04N 21/81 (2011.01)

(52) U.S. Cl.
CPC ....... *H04N 5/44591* (2013.01); *H04N 21/4143* (2013.01); *H04N 21/435* (2013.01); *H04N 21/4307* (2013.01); *H04N 21/4312* (2013.01); *H04N 21/4524* (2013.01); *H04N 21/4622* (2013.01); *H04N 21/4882* (2013.01); *H04N 21/8126* (2013.01)

(58) Field of Classification Search
CPC .. H04N 5/45; H04N 5/44513; H04N 5/44504
See application file for complete search history.

(56) References Cited

U.S. PATENT DOCUMENTS 5,567,046 A * 10/1996 Lucas ............................ 362/405
2010/0287501 A1* 11/2010 Seong et al. ................... 715/810

OTHER PUBLICATIONS

Dobie, Alex, TouchWiz Nature UX: The definitive guide, Jun. 19, 2012, Android Central, pp. 1-35.*
Internet Archive Waybackmachine, How ForecastAdvisor Calculates Accuracy of Weather Forecasts, https://web.archive.org/web/20120122224020/ http://www.forecastadvisor.com/docs/accuracy, Jan. 22, 2012, p. 1.*
Hermann, Lukas, Weather HD2—Yet Another Weather Forecast App?, , Aug. 7, 2012, MacStoreis, pp. 1-10.*

* cited by examiner

*Primary Examiner* — Nathan Flynn
*Assistant Examiner* — Alfonso Castro
(74) *Attorney, Agent, or Firm* — Osha Liang LLP

(57) ABSTRACT

In general, in one aspect, the invention relates to a method for presenting weather data. The method includes displaying a first weather video panel comprising a first video element and a second weather video panel comprising a second video element, where the first video element and the second video element are synchronized, and receiving an instruction to add a third weather video panel. The method further includes, in response to receiving the instruction to add a third weather video panel, displaying the third weather video panel comprising a third video element, and restarting the first weather video panel and the second weather video panel, where after the restarting, the first video element, the second video element, and the third video element are synchronized.

20 Claims, 23 Drawing Sheets

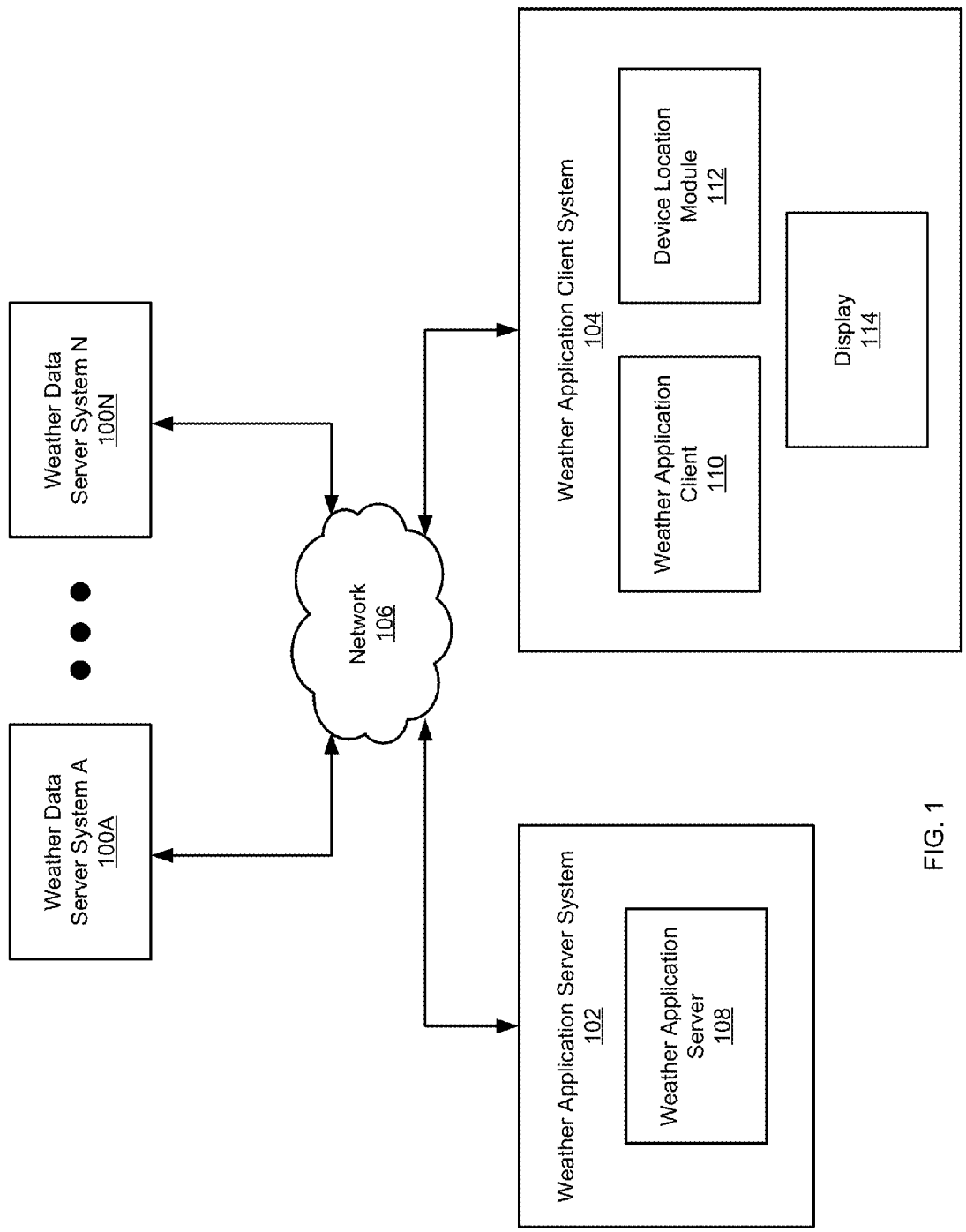

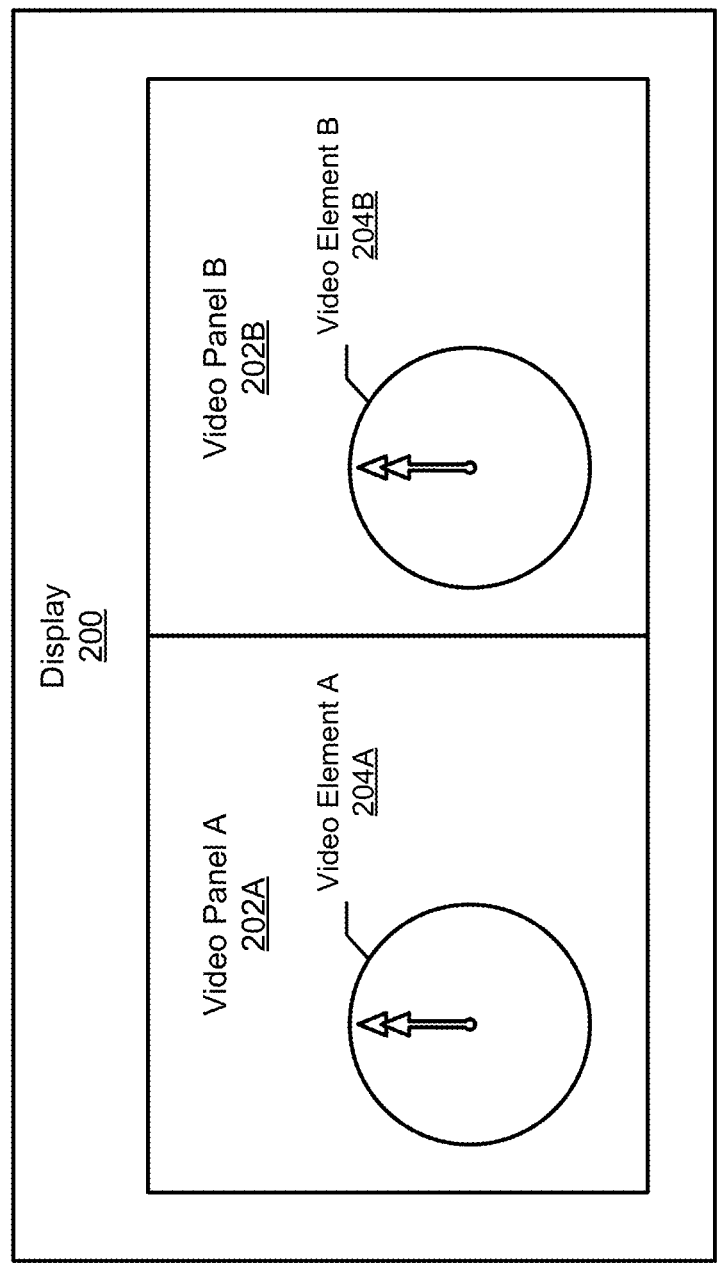

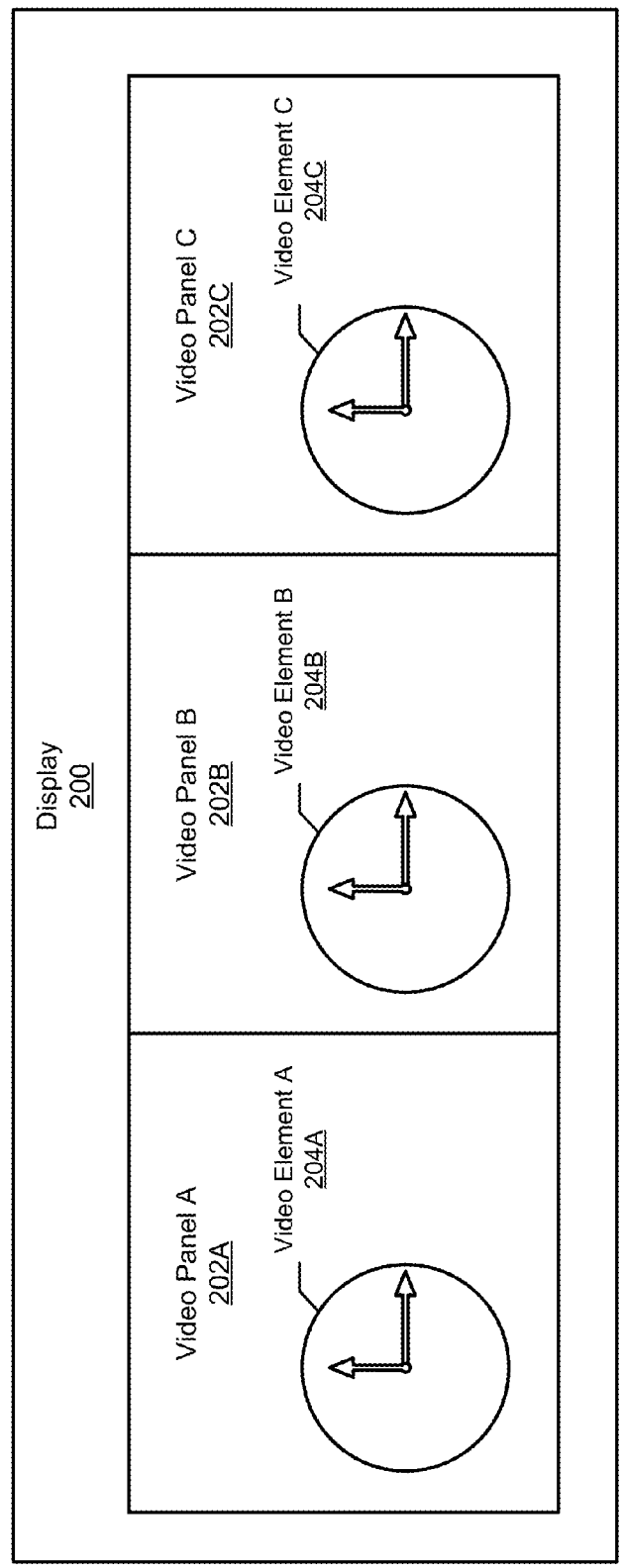

METHOD FOR PRESENTING WEATHER DATA

BACKGROUND

Many people use dedicated weather applications to obtain weather data about their area. Such applications provide the user with basic weather information such as current and expected temperature. Users interpret the provided weather data based on their past weather-related experiences. However, a user may experience new and different weather conditions while traveling. It is important that a dedicated weather application convey weather data to the user in an efficient and natural way such that the user may get the most out of the weather data.

SUMMARY

In general, in one aspect, the invention relates to a method for presenting weather data. The method includes displaying a first weather video panel comprising a first video element and a second weather video panel comprising a second video element, where the first video element and the second video element are synchronized, and receiving an instruction to add a third weather video panel. The method further includes, in response to receiving the instruction to add a third weather video panel, displaying the third weather video panel comprising a third video element, and restarting the first weather video panel and the second weather video panel, where after the restarting, the first video element, the second video element, and the third video element are synchronized.

In general, in one aspect, the invention relates to a non-transitory computer-readable medium comprising instructions that, when executed by a processor, perform a method for presenting weather data. The method includes displaying a first weather video panel comprising a first video element and a second weather video panel comprising a second video element, where the first video element and the second video element are synchronized, and receiving an instruction to add a third weather video panel. The method further includes, in response to receiving the instruction to add a third weather video panel, displaying the third weather video panel comprising a third video element, and restarting the first weather video panel and the second weather video panel, where after the restarting, the first video element, the second video element, and the third video element are synchronized.

In general, in one aspect, the invention relates to a method for presenting an image. The method includes receive an instruction to display the image, generating a first virtual tile and a second virtual tile from the image, where the first virtual tile and the second virtual tile are associated with a contiguous portion of the image, and where the first virtual tile and the second virtual tile share an edge. The method further includes initiating a first image bleeding from a first non-edge location on the first virtual tile, determining a future time target at which the first image bleeding will reach an edge location on the first virtual tile, and initiating a second image bleeding from a second non-edge location on the second virtual tile, where the second image bleeding is initiated to reach a corresponding edge location on the second virtual tile at the future time target.

In general, in one aspect, the invention relates to a non-transitory computer-readable medium comprising instructions that, when executed by a processor, perform a method for presenting weather data. The method includes receive an instruction to display the image, generating a first virtual tile and a second virtual tile from the image, where the first virtual tile and the second virtual tile are associated with a contiguous portion of the image, and where the first virtual tile and the second virtual tile share an edge. The method further includes initiating a first image bleeding from a first non-edge location on the first virtual tile, determining a future time target at which the first image bleeding will reach an edge location on the first virtual tile, and initiating a second image bleeding from a second non-edge location on the second virtual tile, where the second image bleeding is initiated to reach a corresponding edge location on the second virtual tile at the future time target.

Other aspects of the invention will be apparent from the following description and the appended claims.

BRIEF DESCRIPTION OF DRAWINGS

FIG. 1 shows a system in accordance with one or more embodiments of the invention.

FIGS. 2A-2E show a system in accordance with one or more embodiments of the invention.

DETAILED DESCRIPTION

Figure 2A:
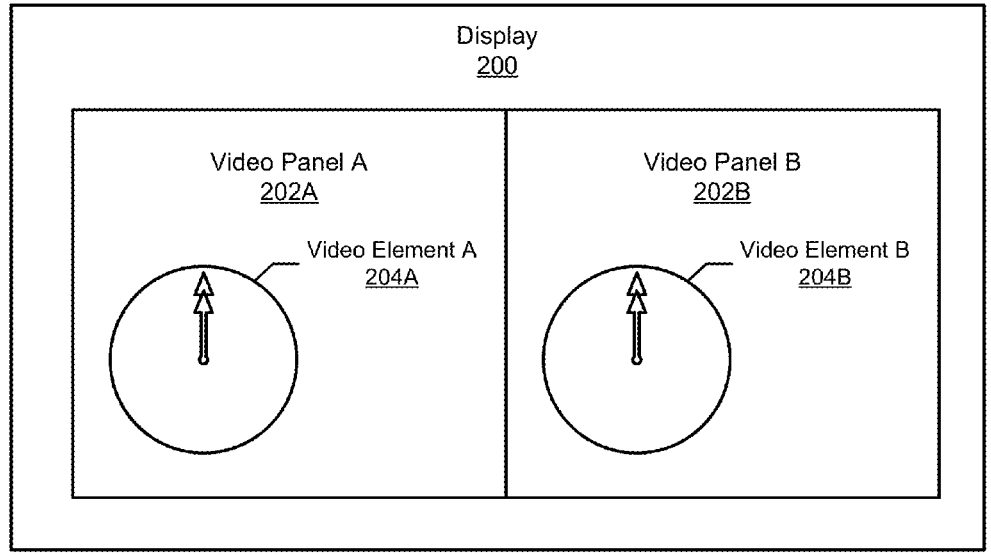

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for conveying weather data to a user. Specifically, embodiments of the invention may be implemented in a dedicated weather application used to obtain and interpret weather data received from weather data servers.

FIG. 1 shows a diagram of a system in accordance with one or more embodiments of the invention. As shown in FIG. 1, the system includes multiple weather data servers (weather data server A (100A), weather data server N (100N)), a weather application server system (102), and a weather application client system (104) communicatively coupled to one another via a network (106). Weather application server system (102) includes a weather application server (108). Weather application client system (104) includes a weather application client (110), a device location module (112), and a display (114).

In one or more embodiments of the invention, the weather data servers (weather data server A (100A), weather data server N (100N)), are computer systems or groups of computer systems under the control of a weather data service provider (e.g., National Weather Service, etc.). In one embodiment of the invention, the weather data servers (weather data server A (100A), weather data server N (100N)) provide weather data to the weather application server (102).

In one or more embodiments of the invention, weather data includes future weather data (e.g. weather forecasts), past weather data, and current weather data. Weather data may further include future (i.e., predicted) or past environmental metrics (e.g., temperature, barometer, humidity, etc.), conditions (e.g., rain, snow, cloudy, fog, etc.), diagrams describing weather patterns (e.g., past or predicted hurricane paths), and/or images describing weather forecasts (e.g., radar maps, satellite maps, etc.).

In one or more embodiments of the invention the weather application server system (102) is a computer system or group of computer systems configured to execute a weather application server (108). In one embodiment of the invention, the weather application server (108) is a process or group of processors configured to obtain weather data from weather data servers (weather data server A (100A), weather data server N (100N)). In one embodiment of the invention, the weather application server (108) provides processed weather data to the weather application client (110) executing on the weather application client system (112).

In one or more embodiments of the invention, the weather application client system (104) is a computer system or group of computer systems configured to execute weather application client (110). The weather application client system (104) may also include a device location module (112) used by the weather application client (110) to obtain location data describing the current location of the weather application client system (104). In one embodiment of the invention, the weather application client (110) generates a weather data query using the location data obtained from the device location module (112). The weather data query may then be submitted to the weather application server (108) executing on the weather application server system (102). Examples of weather application client systems (104) include, but are not limited to, desktop computers, laptop computers, tablet computers, smart phones, and smart television sets.

In one or more monuments of the invention, weather data obtained from the weather application server (108) may be processed by the weather application client (110) for presentation on the display (114). Such presentations may include video windows, tile bleeding, context-based weather reports, and weather report discrepancies, as described below.

Video Windows

In one or more embodiments of the invention, the weather application client (110 in FIG. 1) is configured to present weather data in a set of video panels. Each video panel may display an animated video element related to the weather data. The set of video panels may be used to create the illusion of a single animated video element divided by a set of video panels, where one or more of the video panels present a variation of the animated video element. In one embodiment of the invention, the video element may be pre-recorded or rendered in real-time.

FIGS. 2A-2E show a presentation mechanism in accordance with one or more embodiments of the invention. Specifically, FIGS. 2A-2E show a sequence of presentations on a display (200) that includes two video panels (video panel A (202A), video panel B (202B)). Video panel A (202A) includes video element A (204A), and video panel B (202B) includes video element B (204B). Each video element (video element A (204A), video element B (204B)) is represented by an animated clock.

In one or more embodiments of the invention, each video panel (video panel A (202A), video panel B (202B)) may be set to represent a weather condition in a different geographic location. For example, video panel A (202A) may be set to represent a weather condition in Houston, Tex., and video panel B (202B) may be said to represent a different weather condition in New York City.

In one or more embodiments of the invention, one or more of the video elements (video element A (204A), video element B (204B)) varies from one or more of the other video elements (video element A (204A), video element B (204B)). For example, each video panel (video panel A (202A), video panel B (202B)) may display a sky image as a video element (video element A (204A), video element B (204B)). The sky image in video panel A (202A) may be clear and sunny, while the sky image in video panel B (202B)) may be dark and stormy.

FIG. 2A shows video panel A (202A) and video panel B (202B) at the sync frame. In one embodiment of the invention, the sync frame is a frame of the presented animation used to reset the animation, such as the beginning of a looped animation. The sync frame in FIGS. 2A-2E is represented by the clocks displaying 12:00. As shown in FIG. 2A, both video elements (video element A (204A), video element B (204B)) are at the sync frame.

Figure 2B:
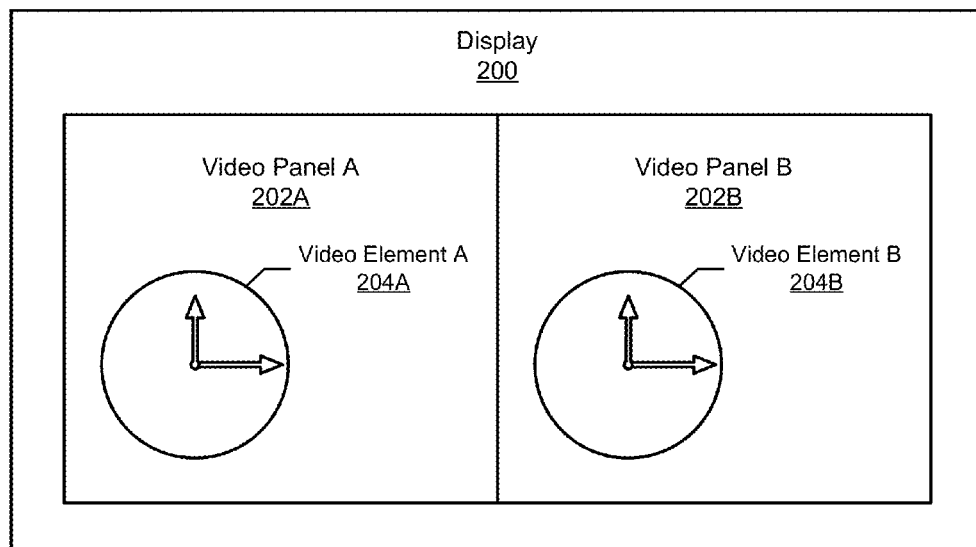

FIG. 2B shows the video panels (video panel A (202A), video panel B (202B)) after the animation has been initialized from the sync frame (i.e., a successive frame of the presented animation). As shown in FIG. 2B, the video panels (video panel A (202A), video panel B (202B)) are synchronized and both show the video element (video element A (204A), video element B (204B)) displaying 12:15.

FIG. 2C shows the video panels (video panel A (202A), video panel B (202B)) after an instruction to add an additional video panel have been received. As shown in FIG. 2C, the video panels (video panel A (202A), video panel B (202B)) are reset to the sync frame and both show the video element (video element A (204A), video element B (204B)) displaying 12:00.

Figure 2D:
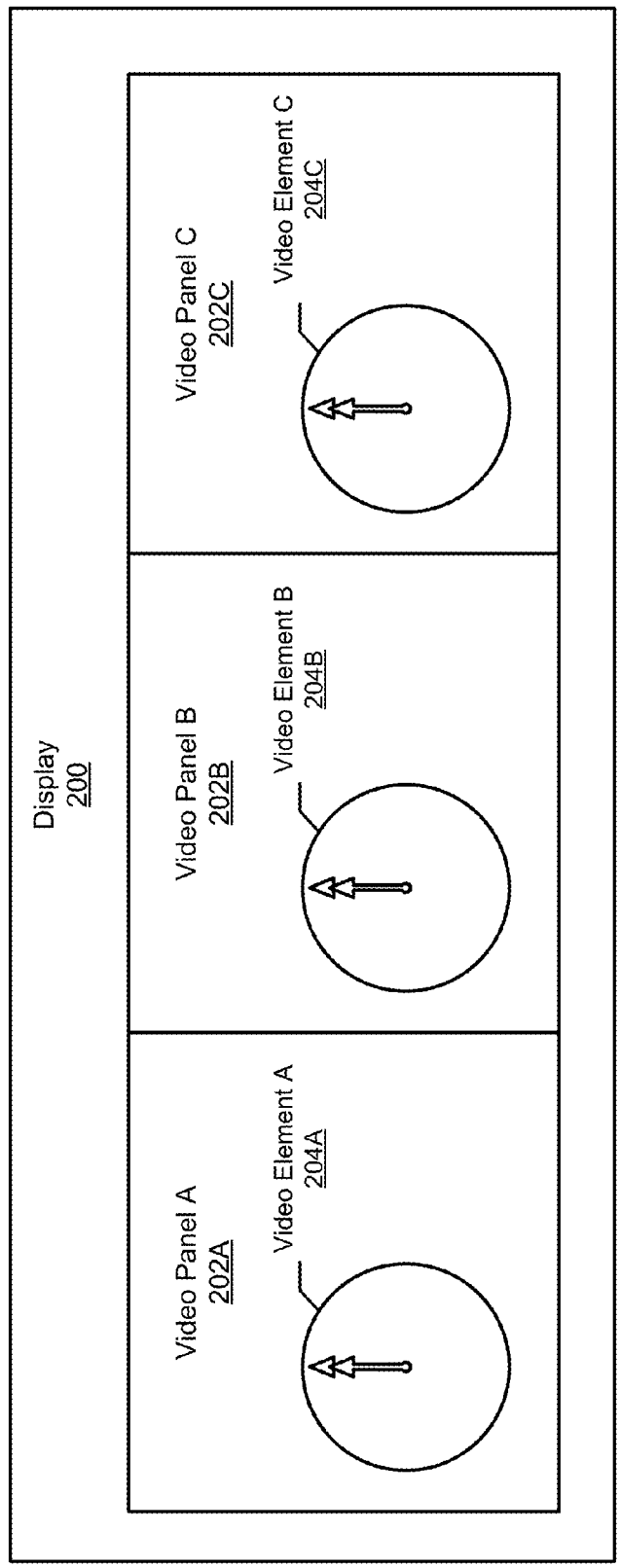

FIG. 2D shows the video panels (video panel A (202A), video panel B (202B)) after an additional video panel has been added. As shown in FIG. 2D, three video panels (video panel A (202A), video panel B (202B), video panel C (202C)) are displayed. Each video panel shows the sync frame and each video element (video element A (204A), video element B (204B), video element C (204C)) is displaying 12:00.

In one or more embodiments of the invention, the process described with reference to FIGS. 2C and 2D may vary. Specifically, the sync frame may be dynamic in nature, and designated as the frame displayed at the time when the additional video panel is added. Instead of resetting the first set of video panels (video panel A (202A), video panel B (202B)), the current frame of the video panels (video panel A (202A), video panel B (202B)) may be designated as the sync frame, and the additional video panel (video panel C (202C)) may be set to the newly designated sync frame when it is added.

FIG. 2E shows the video panels (video panel A (202A), video panel B (202B), video panel C (202C)) after the animation has been initialized from the sync frame. As shown in FIG. 2E, each of the three video panels (video panel A (202A), video panel B (202B), video panel C (202C)) shows a successive frame of the presented animation and each video element (video element A (204A), video element B (204B), video element C (204C)) is displaying 12:15.

Figure 3:
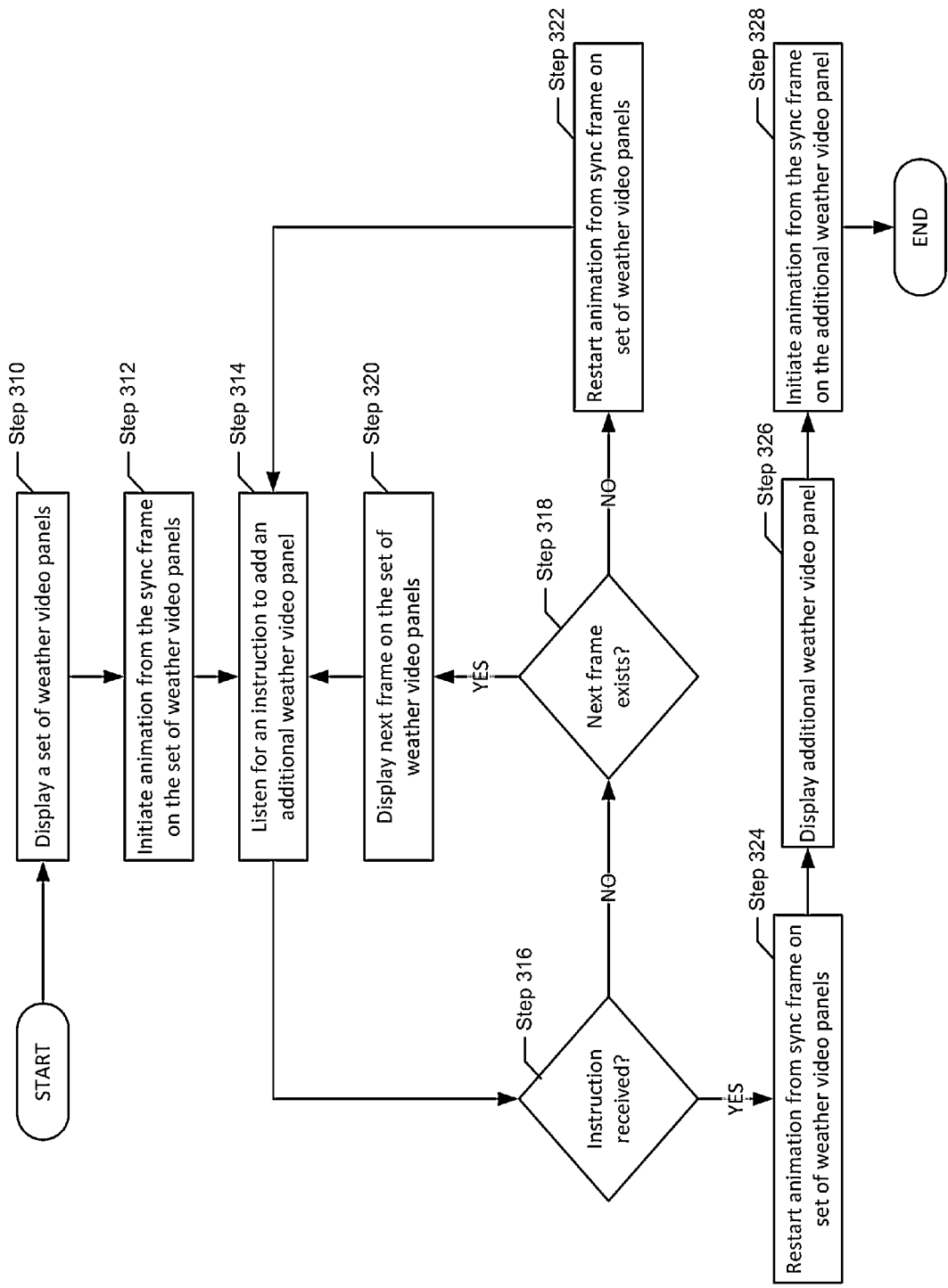
FIG. 3 shows a flow diagram in accordance with one or more embodiments of the invention.

FIG. 3 shows a flowchart for adding a synchronized video panel in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the weather application client displays a set of weather video panels. In Step 312, the weather application client initiates animation from the sync frame on the set of weather video panels. In Step 314, weather application client listens for an instruction to add an additional weather video panel. In Step 316, a determination is made as to whether an instruction has been received. If in Step 316 no instruction is received, then in Step 318, a determination is made as to whether next frame in the animation exists.

If the next frame in the animation exists in Step 318, then the weather application client displays the next frame on the set of weather video panels (Step 320). Process then returns to Step 314. If there is no next frame in the animation in Step 318, then the animation is restarted from the sync frame on each of the set of video panels (Step 322).

If an instruction to add an additional video panel is received (Step 316), then the animation is restarted from the sync frame on the current set of video panels (Step 324). In Step 326, the additional video panel is displayed. In Step 328, the animation is initiated from the sync frame on the additional weather video panel. In one embodiment of the invention, animation on each of the video panels, including the additional video panel, is synchronized.

Figure 4A:
FIGS. 4A-4C show an example in accordance with one or more embodiments of the invention.
Figure 4B:
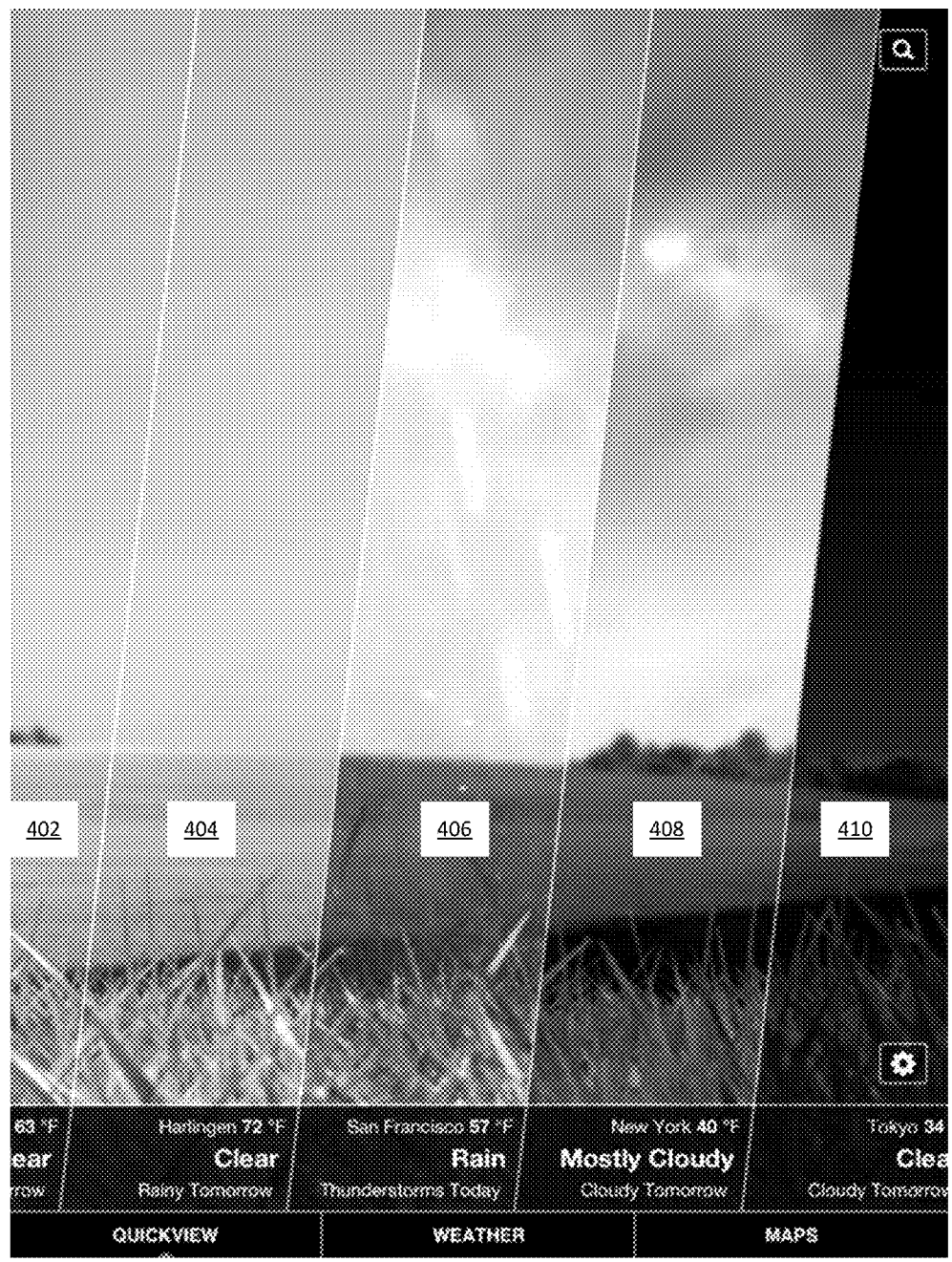
Figure 4C:
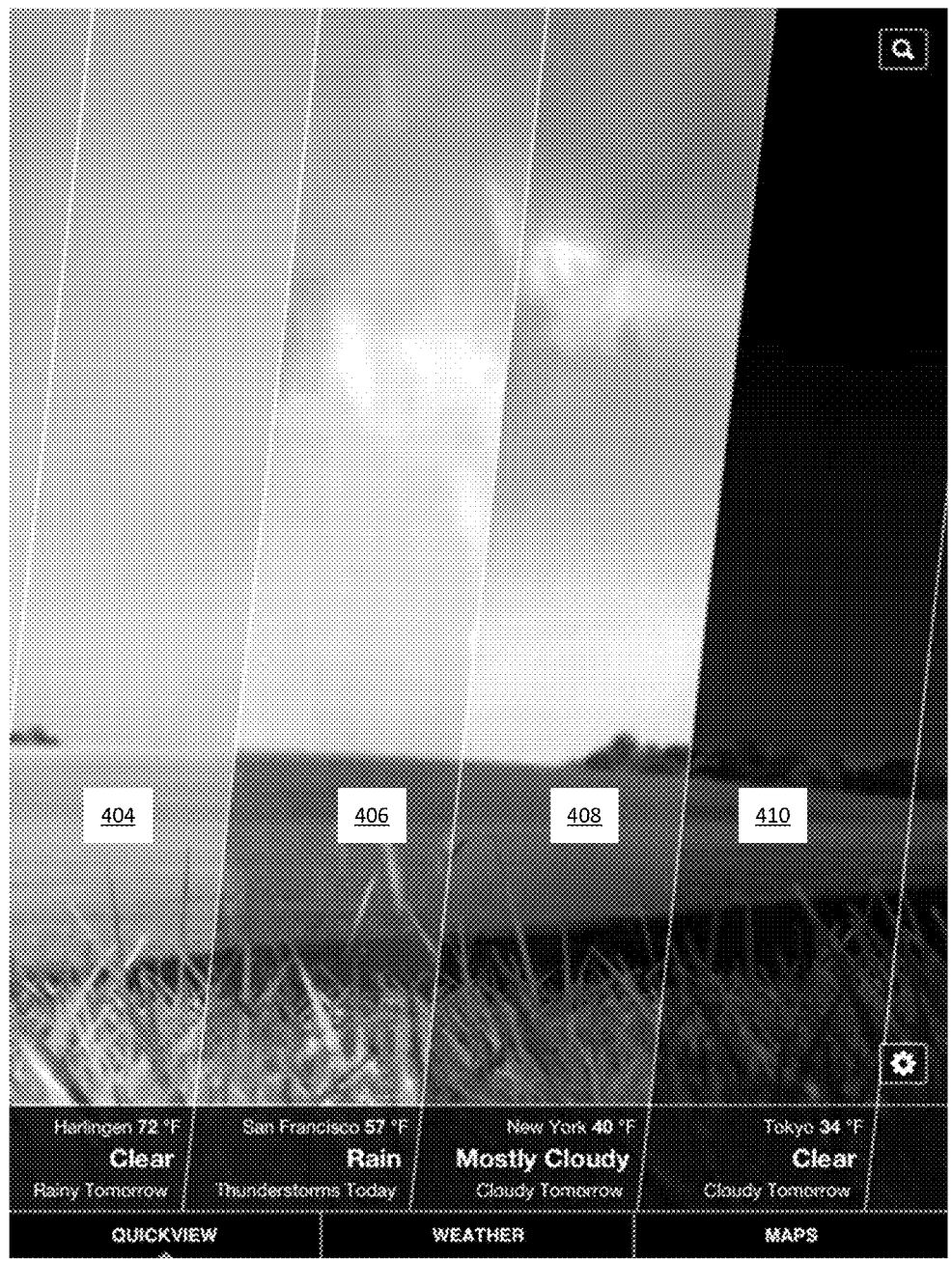

FIGS. 4A-4C show an example in accordance with one or more embodiments of the invention. As shown in FIG. 4A, four video panels are shown. The first weather video panel (402) represents the weather conditions in Houston, Tex. The second weather video panel (404) represents the weather conditions in Harlingen, Tex. The third weather video panel (406) represents the weather conditions in San Francisco, Calif. The fourth weather video panel (408) represents the weather conditions in New York City, N.Y.

As shown in FIG. 4A, each weather video panel displays a portion of a landscape. The landscape is animated to show a video element (grass) moved by blowing wind. The landscape, as shown in the first weather video panel (402) and second weather video panel (404), is clear. The landscape, as shown in the third weather video panel (406), is rainy. The landscape, as shown in the fourth weather video panel (408), is cloudy.

FIG. 4B shows the addition of a fifth weather video panel (410) representing the weather conditions in Tokyo, Japan. Each of the weather video panels is displaying sync frame (more specifically, a portion of the sync frame). The video elements (such as the grass) are synchronized. FIG. 4C shows a successive frame of the animation.

Tile Bleeding

In one or more embodiments of the invention, the weather application client (110 in FIG. 1) is configured to present weather data in an animation using a tile bleeding effect. The effect may be used to create the illusion of a spreading weather condition over a geographic region.

Figure 5A:
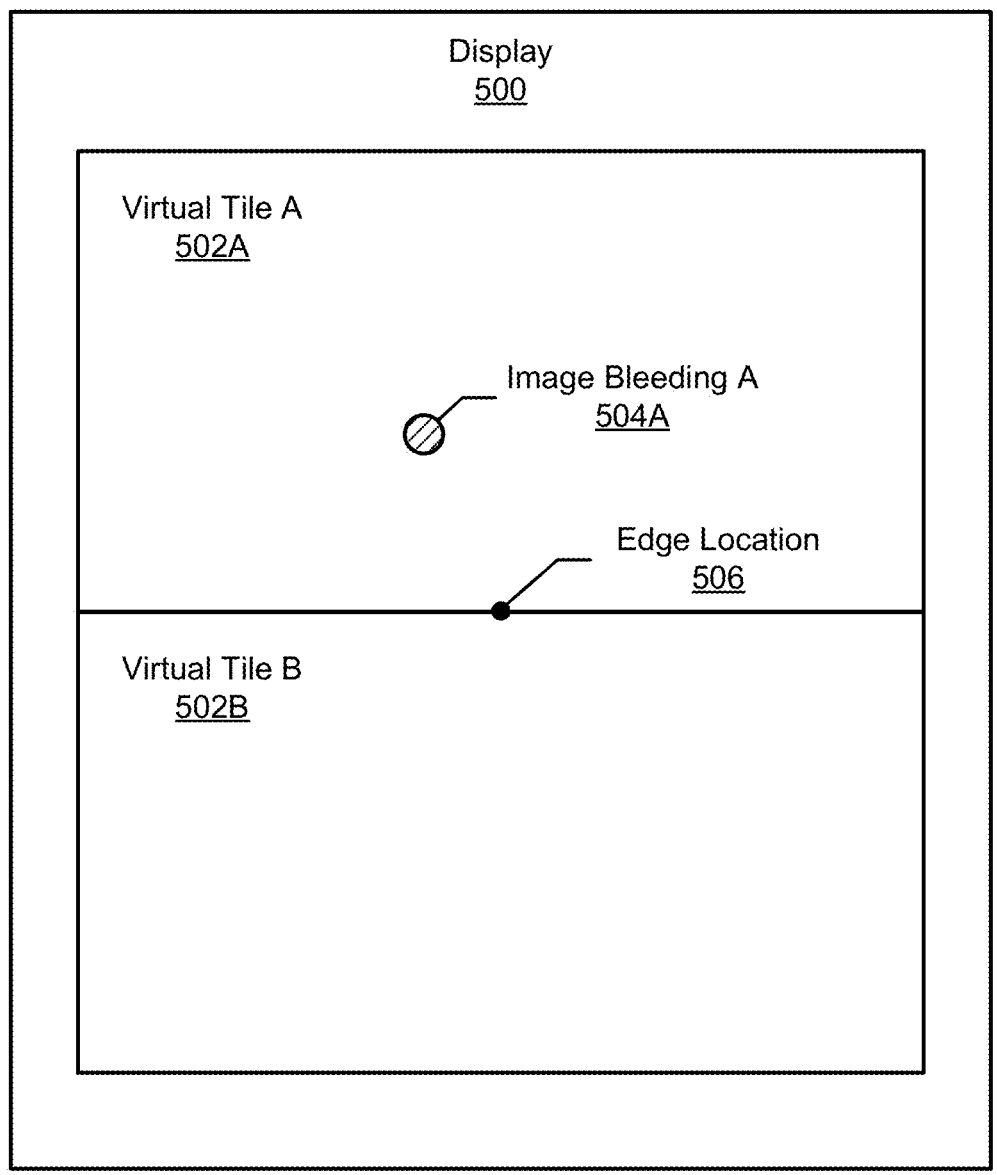
FIGS. 5A-5E show a system in accordance with one or more embodiments of the invention.

FIGS. 5A-5E show a presentation mechanism in accordance with one or more embodiments of the invention. Specifically, FIGS. 5A-5E show a sequence of presentations on a display (500) that includes two virtual tiles (virtual tile A (502A), virtual tile B (502B)). FIG. 5A shows virtual tile A (502A) presenting image bleeding A (504A). A point along the contiguous region between virtual tile A (502A) and virtual tile B (502B) has been designated the edge location (506).

In one or more embodiments of the invention, a virtual tile (virtual tile A (502A), virtual tile B (502B)) is a portion of the display that initially shows no image. The images to be displayed in each virtual tile (virtual tile A (502A), virtual tile B (502B)) are "bled" in. Said another way, only a portion of the image is initially displayed, and that portion becomes larger until it fills the virtual tile (virtual tile A (502A), virtual tile B (502B)). In one embodiment of the invention, the portion of the image grows larger in a manner resembling liquid spreading to cover a surface.

In one or more embodiments of the invention, the point at which image bleeding A (504A) is initiated is selected at random between a set numbers of non-edge points within virtual tile A (502A). In one embodiment of the invention, edge location (506) is selected at random between a set number of points along the shared edge between virtual tile A (502A) and virtual tile B (502B). Alternatively, in one embodiment of the invention, edge location (506) is selected based on the closest point on the edge of virtual tile A (504A) to the point at which image bleeding A (504A) is initiated.

Figure 5B:
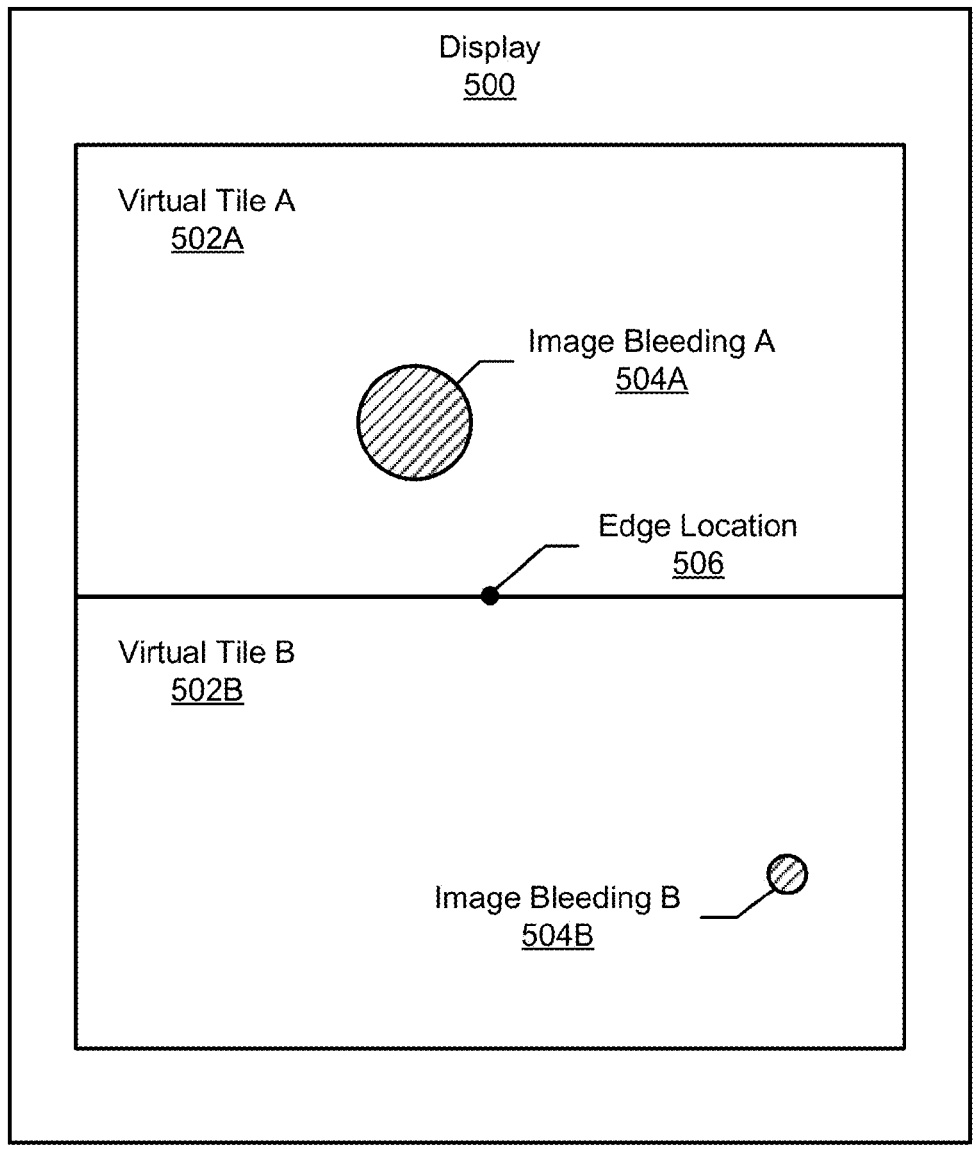

FIG. 5B shows the display (500) after some pre-determined period of time. As shown in FIG. 5B, image bleeding A (504A) has grown larger. The growth of image bleeding A (504A) is at a rate such that the image bleeding A (504A) will reach the edge location (506) at some future time target. FIG. 5B also shows that image bleeding B (504B) has been initiated.

Figure 5C:
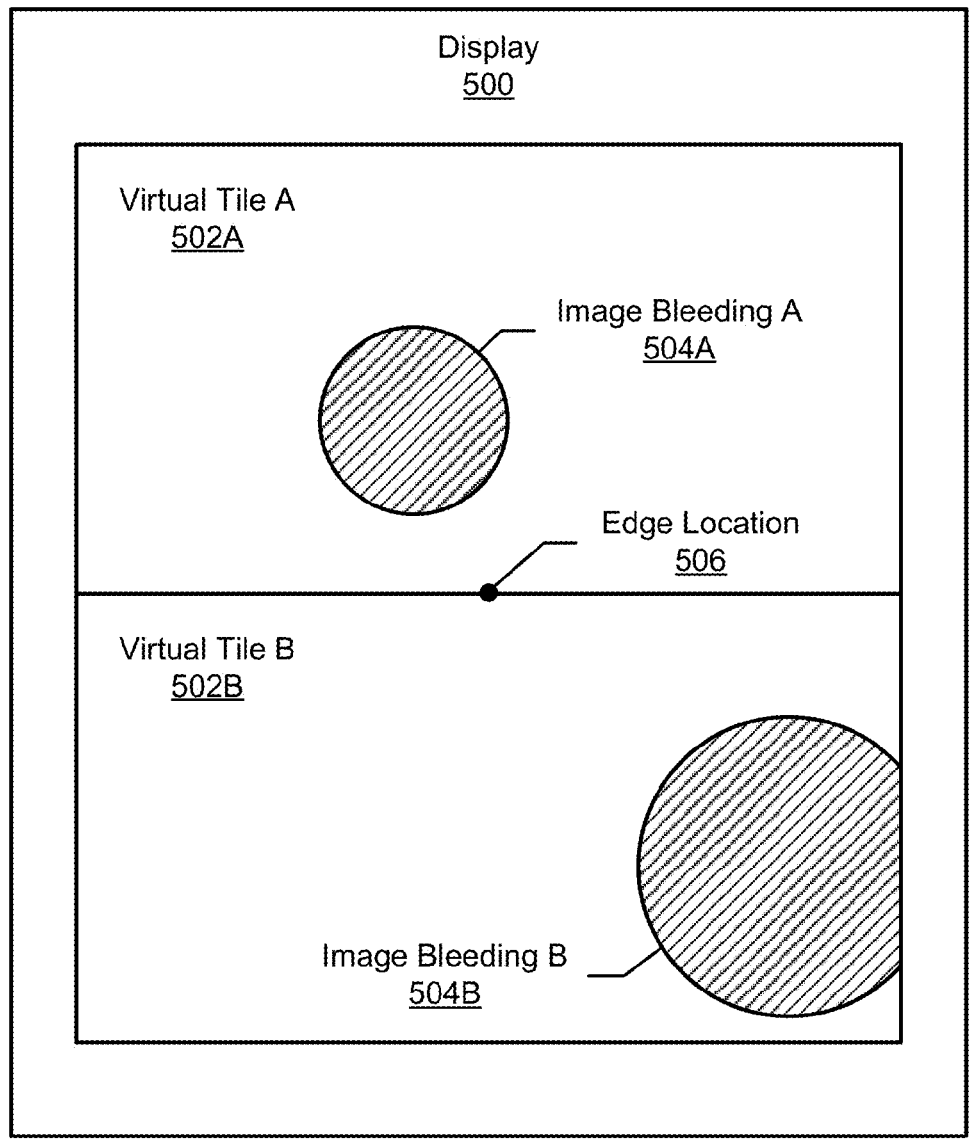

FIG. 5C shows the display (500) after an additional period of time. As shown in FIG. 5C, image bleeding A (504A) has continued to grow larger at the same rate. Image bleeding B (504B) has been initiated to grow larger at a different rate. Specifically, image bleeding B (504B) has been initiated to grow at a rate such that image bleeding B (504B) will reach edge location (506) at or near the future time target (the time at which image bleeding A (504A) will reach edge location (506)). As shown in FIG. 5C, image bleeding B (504B) is growing at a faster rate then image bleeding A (504A), and therefore has grown larger than image bleeding A (504A).

Figure 5D:
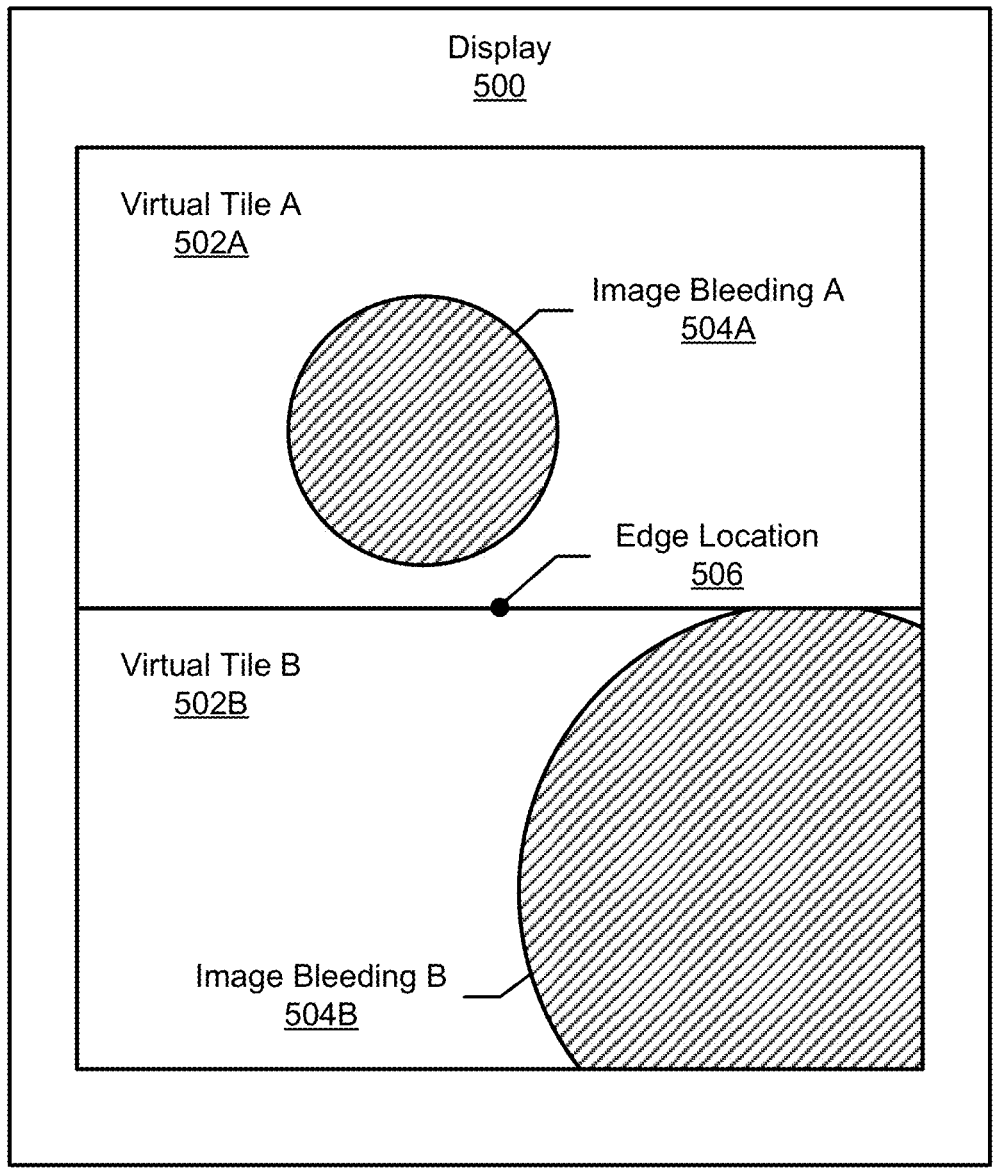
Figure 5E:
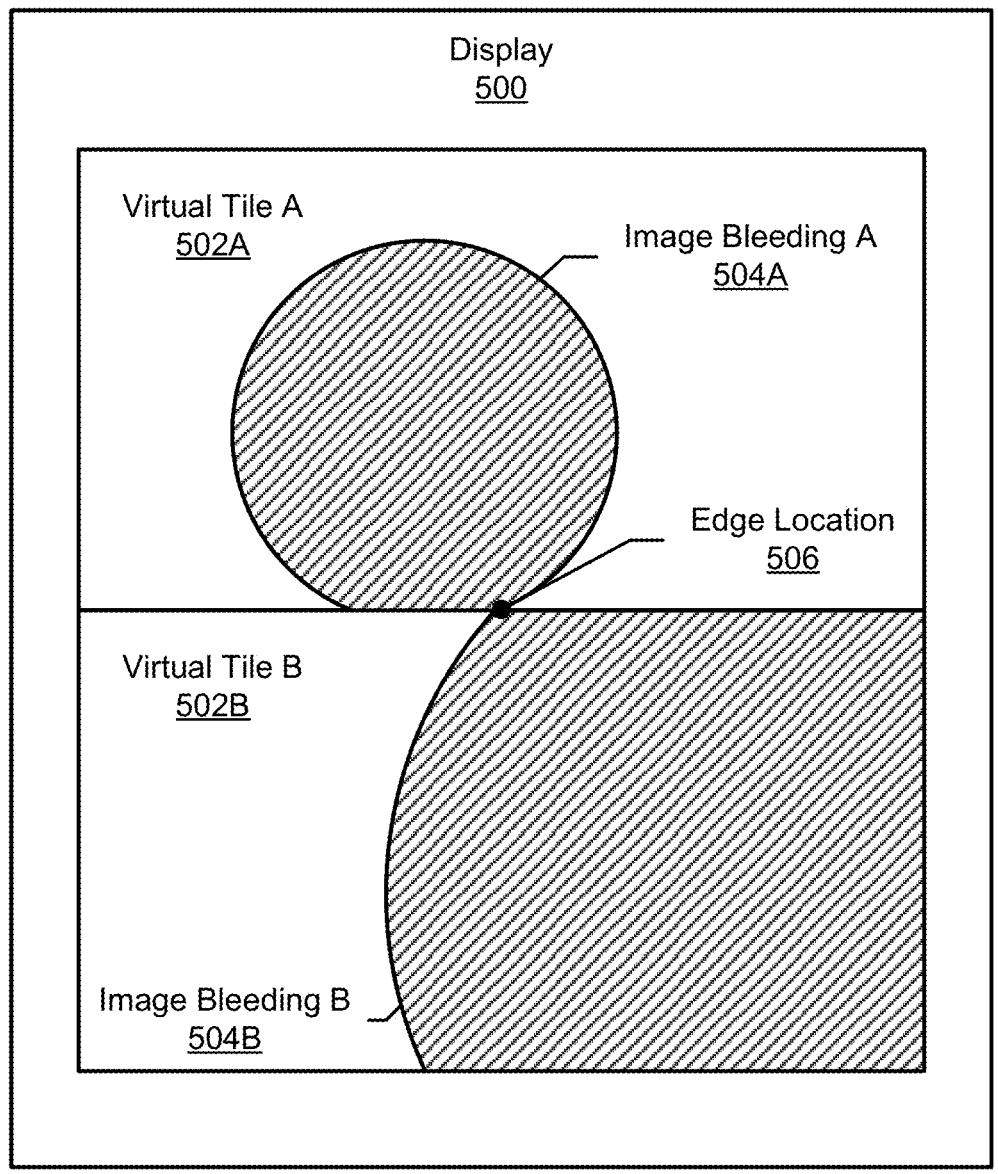

FIG. 5D shows the display (500) after an additional period of time. As shown in FIG. 5C, both image bleeding A (504A) and image bleeding B (504B) have grown larger, but at different rates. FIG. 5E shows the display (500) at the future time target. As shown in FIG. 5E, both image bleeding A (504A) and image bleeding B (504B) have reached edge location (506). The image to be displayed on virtual title A (502A) occupies approximately 25% of virtual tile A (502A), and the image to be displayed on virtual title B (502B) occupies approximately 60% of virtual tile B (502B). Both image bleeding A (504A) and image bleeding B (504B) may continue to grow at their individual rates until the image fills each respective tile.

Figure 6:
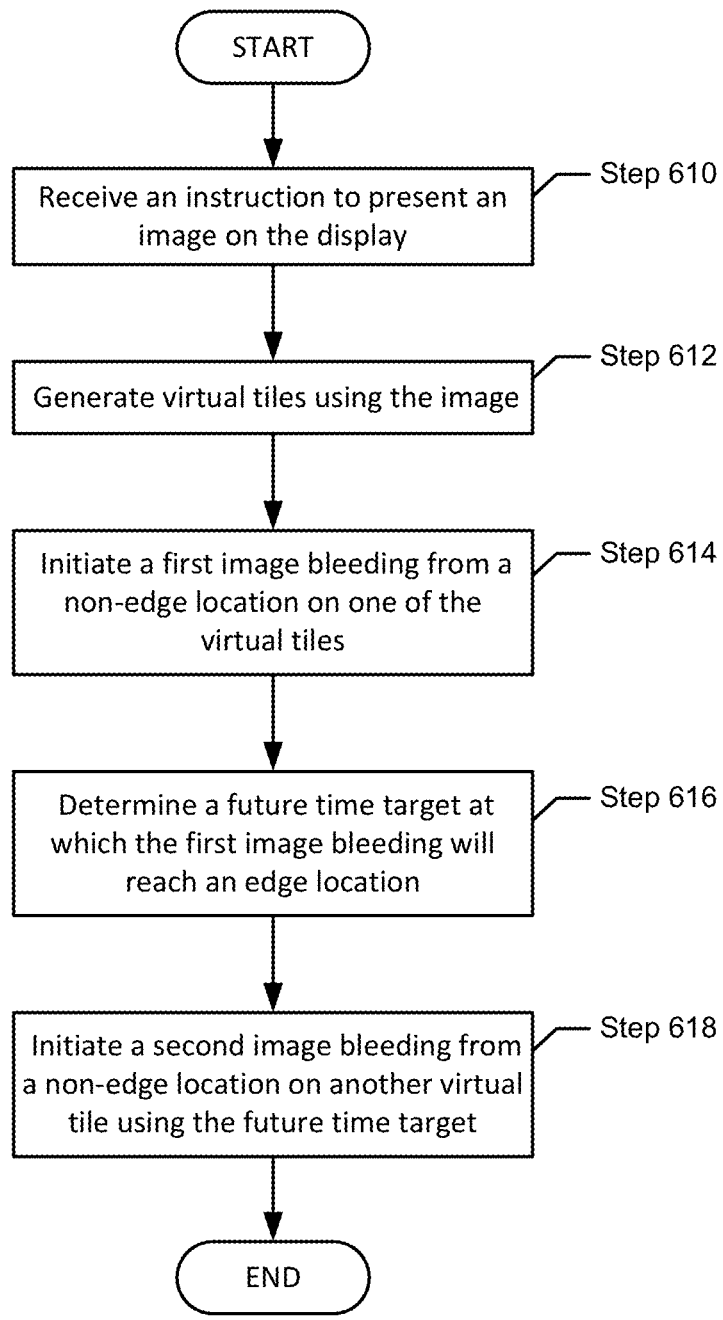
FIG. 6 shows a flow diagram in accordance with one or more embodiments of the invention.

FIG. 6 shows a flowchart for bleeding an image onto a virtual tile in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 610, instruction is received to present an image on a display. In Step 612, the weather application client generates virtual tiles using the image. In one embodiment of the invention, the virtual tiles are rectangular. However, one skilled in the art will appreciate that the virtual tiles may be generated as a shape with any number of sides or a combination of different shapes. In one embodiment of the invention, the division between virtual tiles on the display is not visible.

In Step 614, the weather application client initiates a first image bleeding from a non-edge location on one of the virtual tiles. In Step 616, the weather application client determines a future time target at which the first image bleeding will reach an edge location. In Step 618, the weather application client initiates a second image bleeding from a non-edge location on another virtual tile using the future time target. Specifically, the second image bleeding is initiated such that the second image bleeding will reach the edge location at or near the future time target.

Figure 7A:
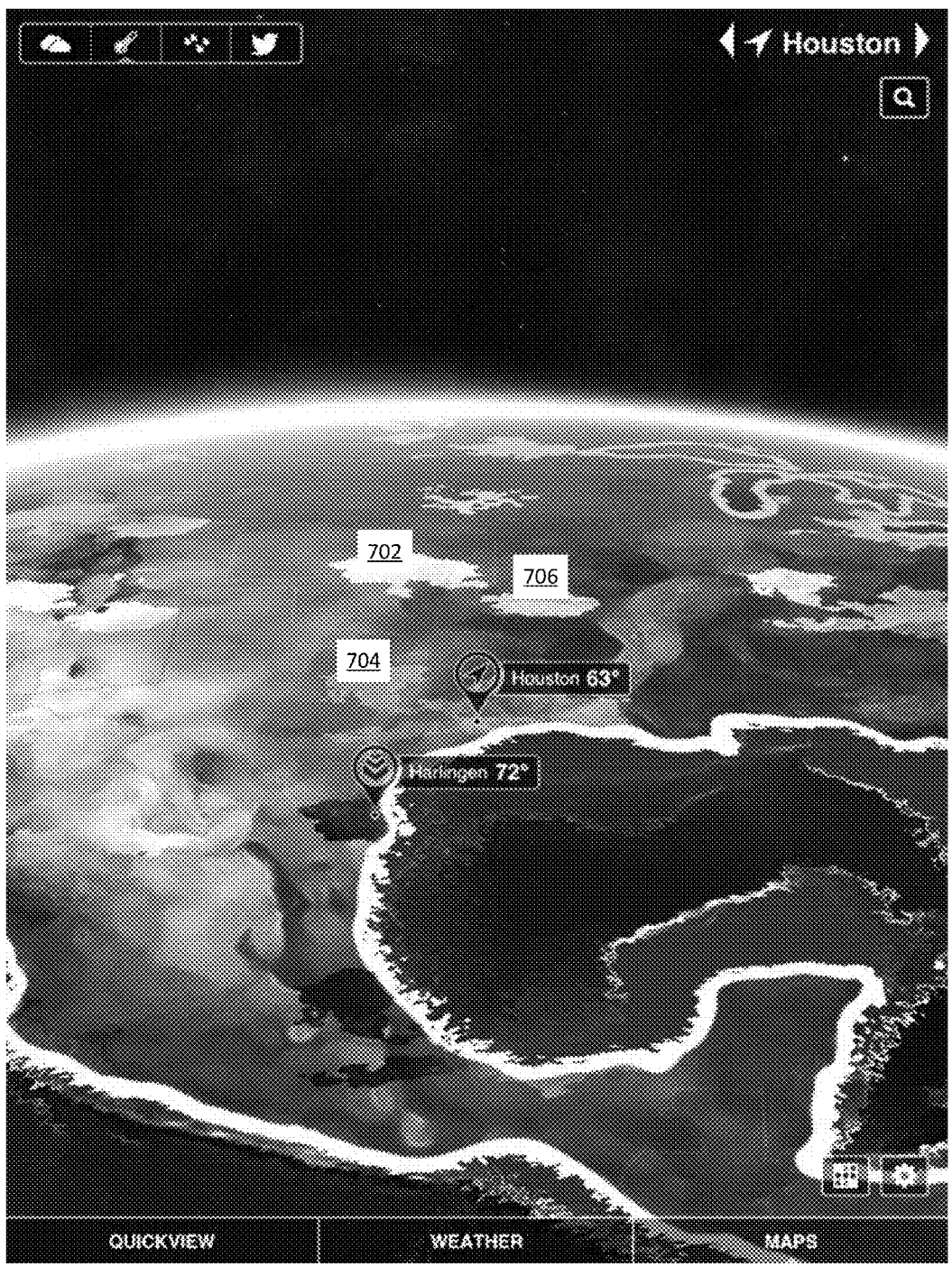
FIGS. 7A-7E show an example in accordance with one or more embodiments of the invention.
Figure 7B:
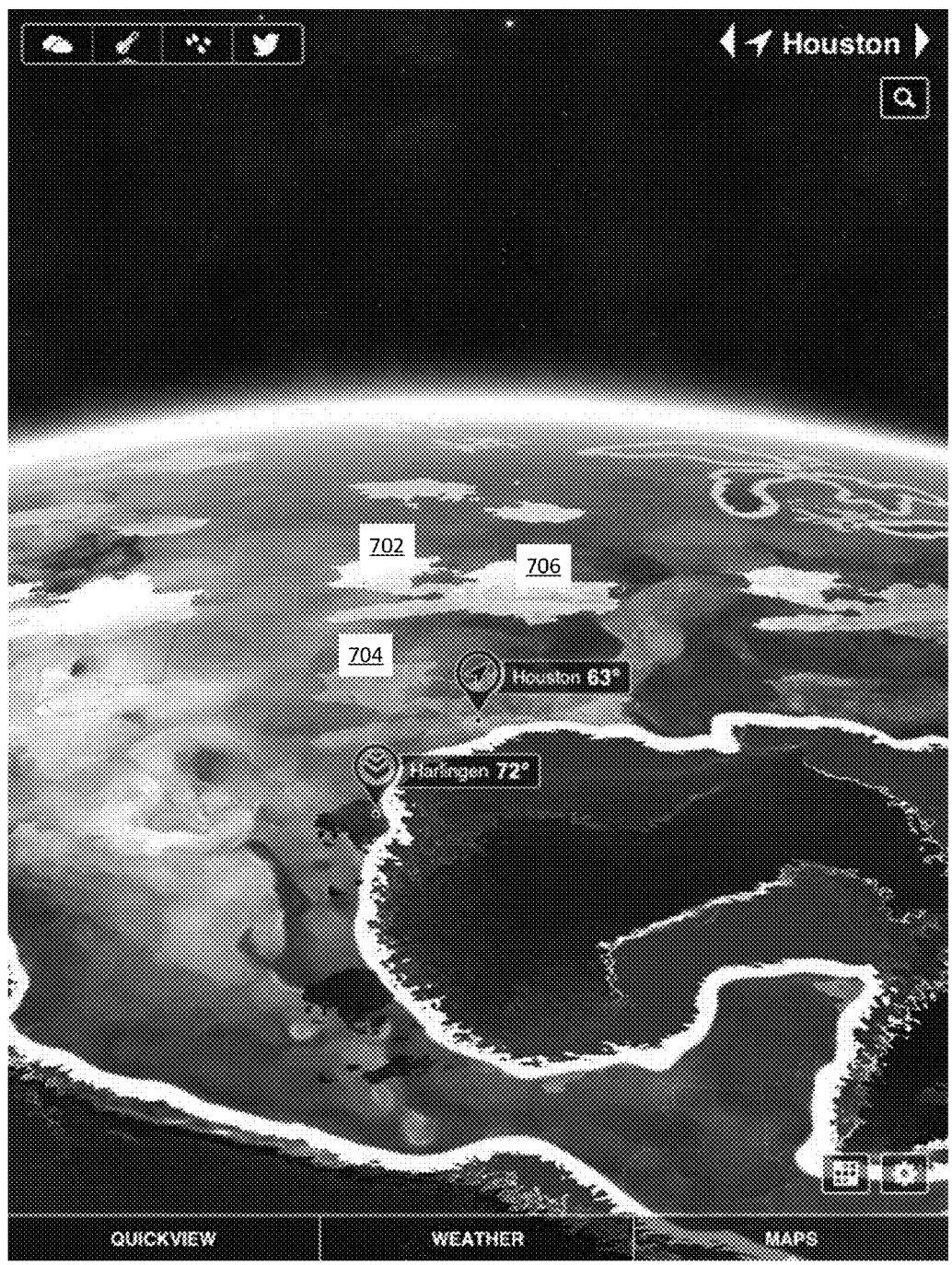

FIGS. 7A-7E show an example in accordance with one or more embodiments of the invention. Specifically, FIGS. 7A-7E show a temperature map image (image bleeding) being bled on top of a map of the southern United States. FIG. 7A shows the image bleedings (the lighter irregular shapes) (e.g., (702), (704), (706)) at a point in time just after initialization. FIG. 7B shows the same display at some later point in time. As shown in FIG. 7B, the image bleedings (e.g., (702), (704), (706)) have grown larger.

Figure 7C:
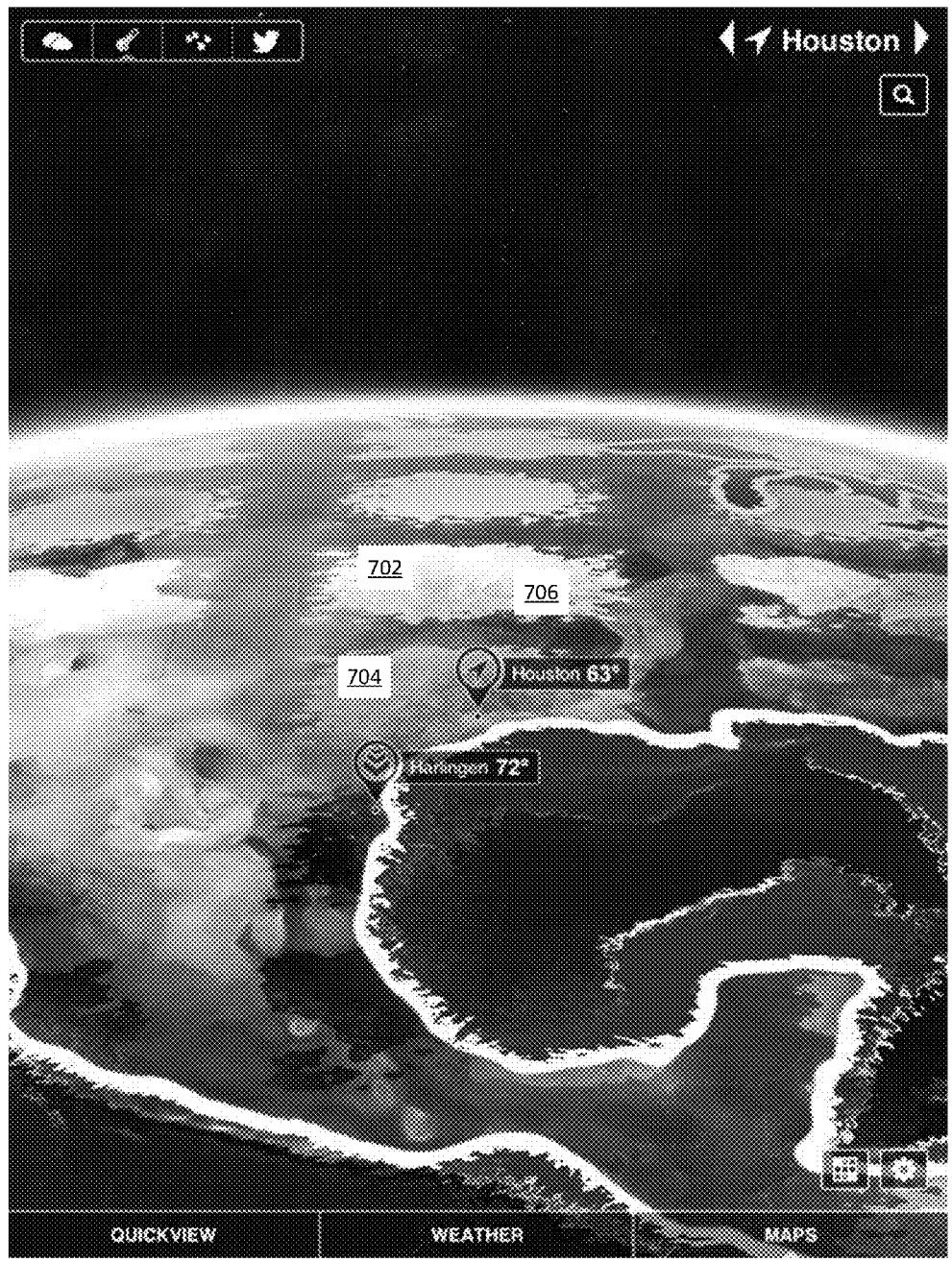
Figure 7D:
Figure 7E:
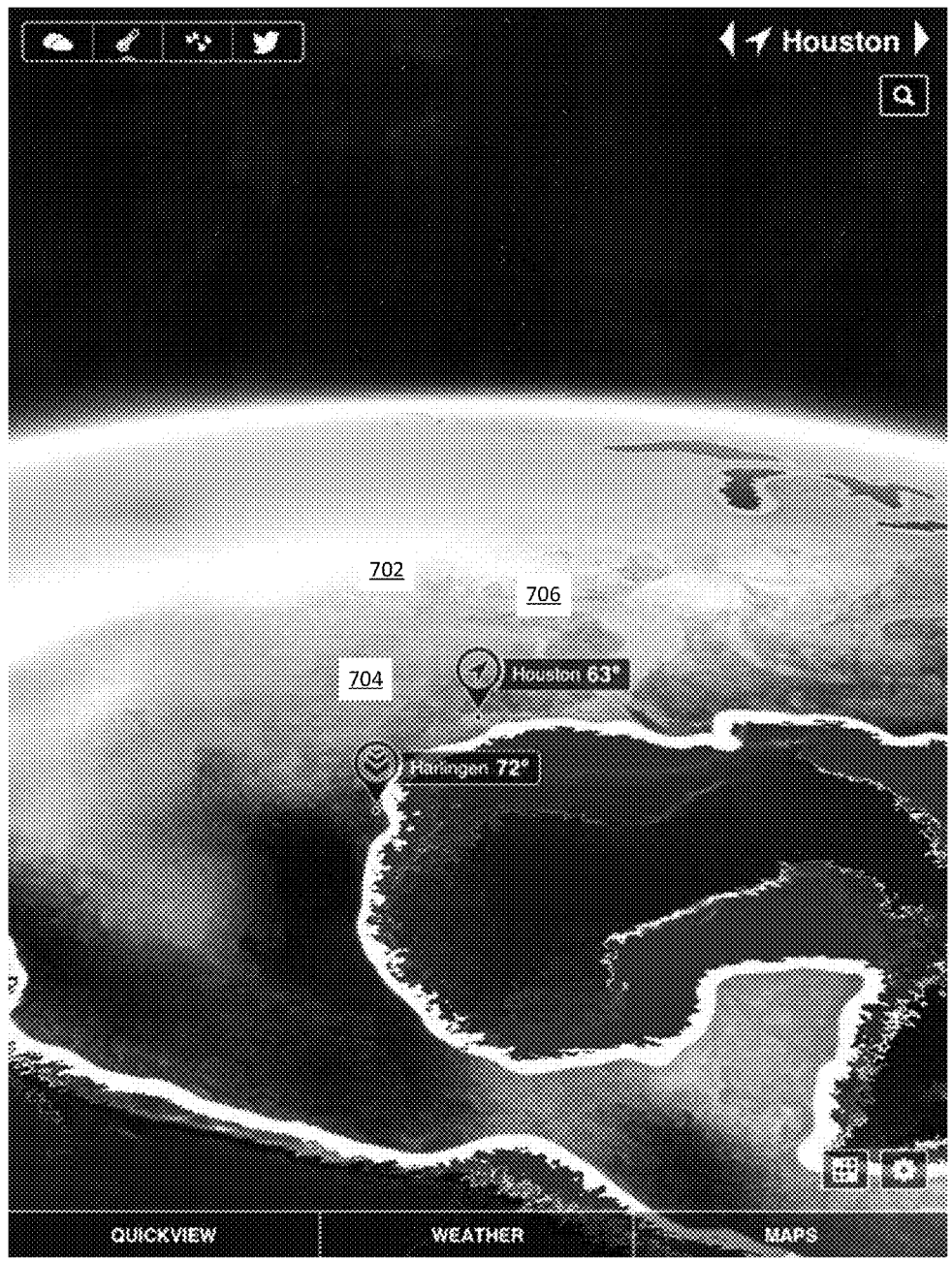

FIG. 7C shows the same display at some later point in time. As shown in FIG. 7C, the individual image bleedings (e.g., (702), (704), (706)) on each tile have grown to cover the majority of each tile. FIG. 7D shows the same display at some later point in time. As shown in FIG. 7D, the individual image bleedings (e.g., (702), (704), (706)) have begun to reach the edge locations between the tiles. Finally, as shown in FIG. 7E, the image bleedings (e.g., (702), (704), (706)) have completely encompassed each tile.

Context-Based Weather Reports

In one or more embodiments of the invention, the weather application client (110 in FIG. 1) is configured to present weather data based on a context. A context may include the location of a weather application client system and/or recent historical weather data. In one embodiment of the invention, a context-based weather report is a presentation of weather data that focuses on unusual or unexpected weather events (such as rain during a dry season, or a sunny day during a rainy season).

Figure 8:
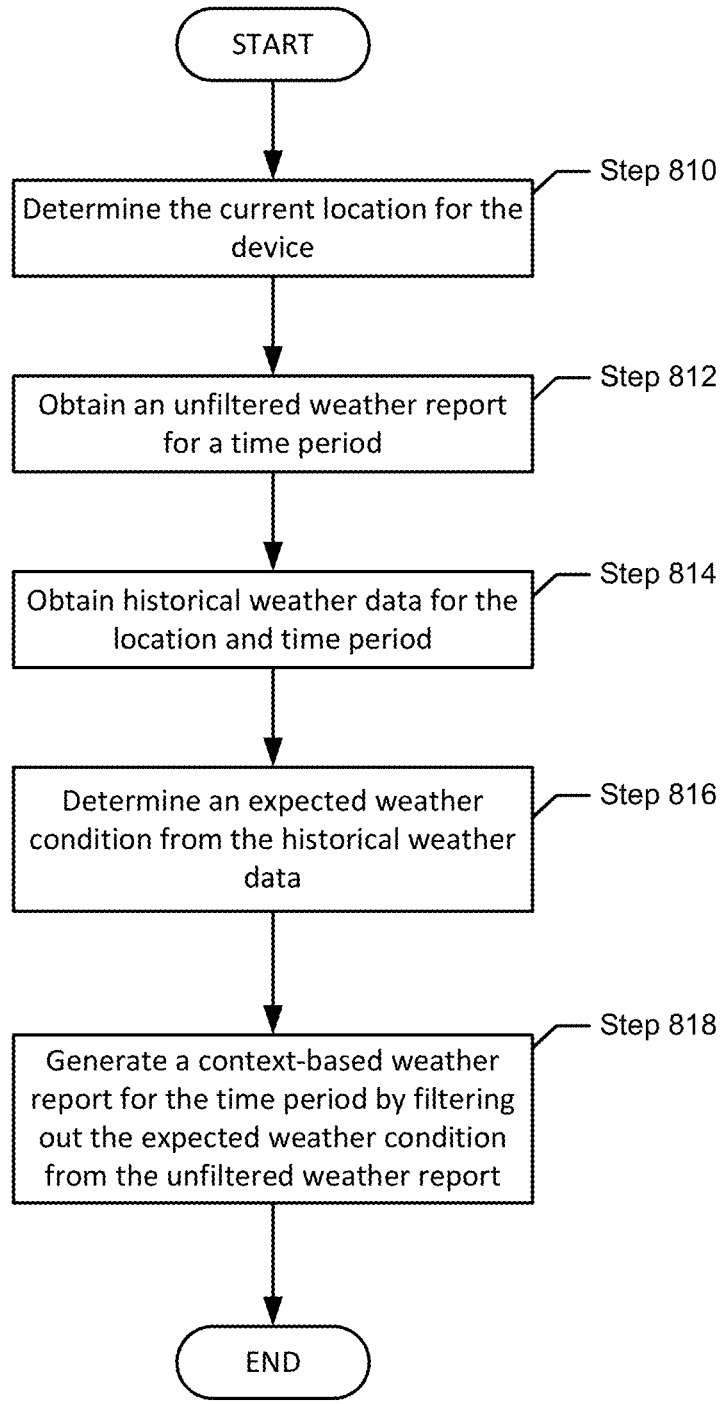
FIG. 8 shows a flow diagram in accordance with one or more embodiments of the invention.

FIG. 8 shows a flowchart for generating a context-based weather report in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 810, the weather application client determines the current location for the device using the device location module. In one embodiment of the invention, the weather application client also obtains the current date and current time from the weather application client system. In one embodiment of the invention, the current location may be obtained by alternative means (e.g., based on user search, directly inputted by a user, etc.). In Step 812, the weather application client obtains an unfiltered weather report for the current time using the current device location. In one embodiment of the invention, an unfiltered weather report includes weather data for the current location of the device. In one embodiment of the invention, the current location of the device is obtained from a device location module on the weather application client system.

In Step 814, the weather application client obtains the historical weather data for the device's historical location and time. In one embodiment of the invention, the historical weather data is obtained from one or more weather data server systems via the weather application server system. In one embodiment of the invention, the device location module maintains historical location data about where the device has been over a period of time. For example, if the weather application client system has remained in the same geographic location during the recent past, then the current location of the device will be similar to the historical location data. However, if the user is traveling, then the current location of the device may differ from the historical location data.

In Step 816, the weather application client determines the expected weather condition from historical weather data. In one embodiment of the invention, the weather application client uses the historical weather data to determine the weather condition commonly associated with a time period and location. The expected weather condition may be determined using annual condition and temperature averages for the current day, week, or month. For example, the expected weather condition for December $10^{th}$ in Houston, Tex. may be foggy and 60 degrees.

In Step 818, the weather application client generates a context-based weather report for the time period by filtering out the expected weather condition from the unfiltered weather report. In one embodiment of the invention, the weather application client filters out the expected weather condition from the unfiltered weather report to determine if the current weather data varies from the historical expectation. For example, if the current weather forecast for December $10^{th}$ for Houston, Tex. is clear and 60 degrees, the context-based weather report would indicate that December $10^{th}$ will be clear (because 60 degrees is an expected weather condition and that data (60 degrees) was therefore filtered out and not shown).

Weather Report Discrepancies

In one or more embodiments of the invention, the weather application client (110 in FIG. 1) is configured to present weather data based on discrepancies between weather reports.

Figure 9:
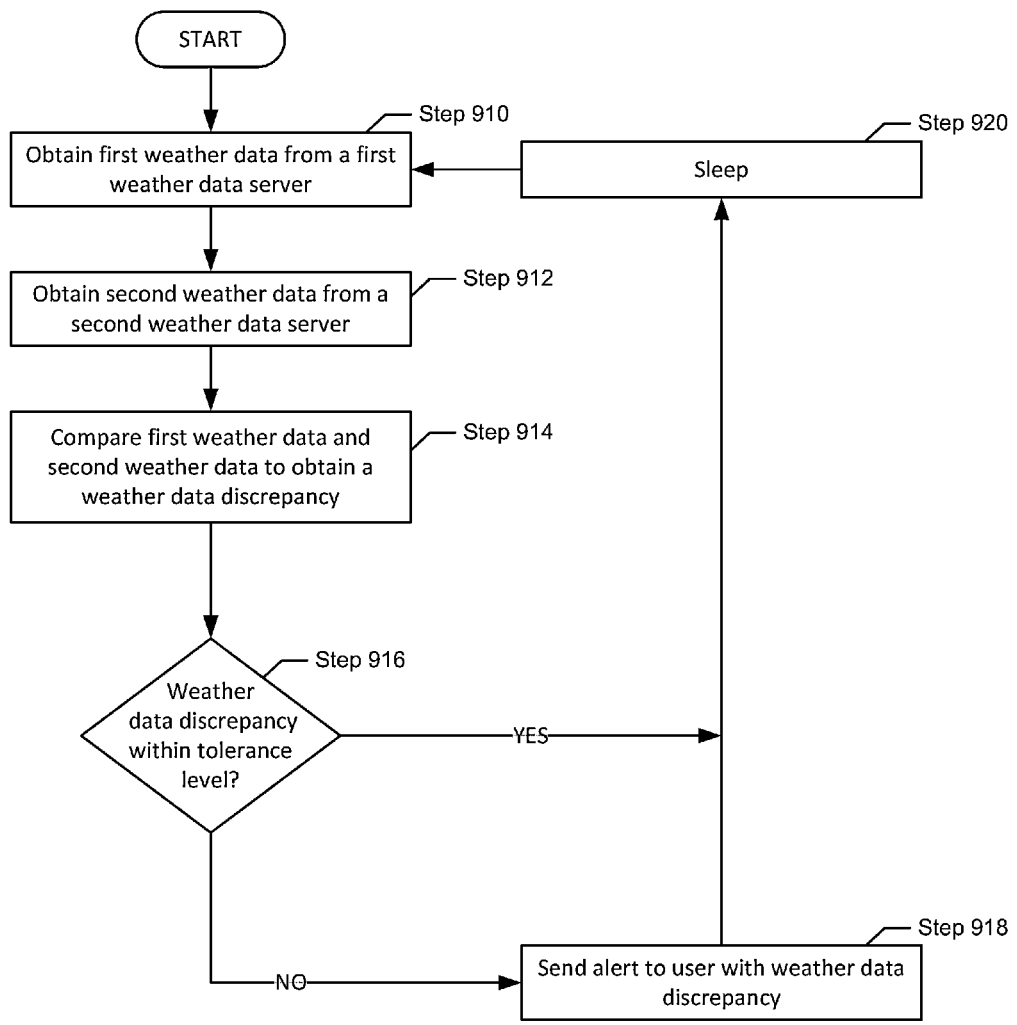
FIG. 9 shows a flow diagram in accordance with one or more embodiments of the invention.

FIG. 9 shows a flowchart for determining weather report discrepancies in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 910, the weather application client obtains first weather data from a first weather data server. In Step 912, the weather application client obtains second weather data from a second weather data server. In Step 914, the weather application client compares the first weather data and the second weather data to obtain a weather data discrepancy. In Step 916, a determination is made as to whether the weather data discrepancy is within a (pre-defined) tolerance level. In one embodiment of the invention, the tolerance level is a number of units between two weather metrics (e.g., 3 degrees between two temperature measurements, 5 percentage points between two humidity measurements or the chance of precipitation, etc.). In one embodiment of the invention, the tolerance level is a comparison of weather conditions. For example, a reported weather condition of "cloudy" and another reported weather condition of "partly cloudy" may be considered to be within tolerance levels. Whereas a reported weather condition of "cloudy" and another reported weather condition of "sunny" may be considered outside tolerance levels.

If in Step 916, the weather application client determines that the weather data discrepancy is outside the tolerance level, then in Step 918, an alert is sent to the user (be it the weather service or the user of mobile device) that contains the weather data discrepancy. If in Step 916 the weather application client determines that no weather data discrepancy exists or that the weather data discrepancy is within the tolerance level, then in Step 920, the weather application client sleeps.

Figure 10:
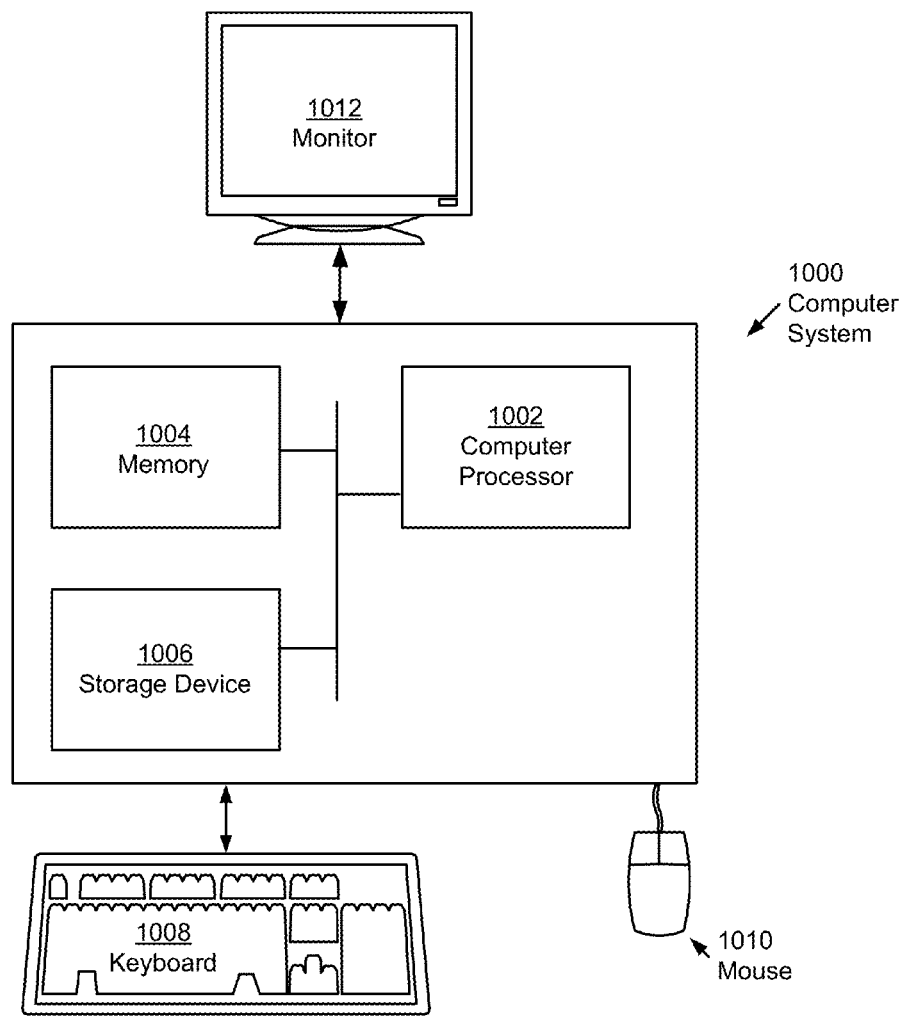
FIG. 10 shows a computer system in accordance with one or more embodiments of the invention.

Embodiments of the invention may be implemented on virtually any type of computer regardless of the platform being used. For example, as shown in FIG. 10, a computer system (1000) includes one or more computer processors (1002) such as a central processing unit (CPU) or other hardware processor(s), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1002) is hardware. For example, the processor may be an integrated circuit. The computer system (1000) may also include input means, such as a keyboard (1008), a mouse (1010), or a microphone (not shown). Further, the computer system (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for presenting weather data comprising:
   displaying, by a computer processor, a first weather video panel comprising a first video element and a second weather video panel comprising a second video element, wherein the first video element comprises a first portion of an image showing a first condition, wherein the second video element comprises a second portion of the image showing a second condition, and wherein the first video element and the second video element are synchronized;
   receiving an instruction to add a third weather video panel;
   in response to receiving the instruction to add a third weather video panel:
      displaying, by the computer processor, the third weather video panel comprising a third video element, wherein the third video element comprises a third portion of the image showing a third condition; and
   restarting, by the computer processor, the first weather video panel and the second weather video panel, wherein after the restarting, the first video element, the second video element, and the third video element are synchronized.

2. The method of claim 1, further comprising:
   receiving a request for a context-based weather report for a time period;
   obtaining an unfiltered weather report for the time period;
   determining a current location of the device;
   obtaining historical weather data for the location and the time period;
   determining an expected weather condition from the historical weather data; and
   obtaining the context-based weather report for the time period by filtering out the expected weather condition from the unfiltered weather report.

3. The method of claim 1, further comprising:
   obtaining a first weather report from a first source;
   obtaining a second weather report from a second source;
   determining a report discrepancy based on a comparison between the first weather report and the second weather report; and
   present an alert comprising the report discrepancy.

4. The method of claim 1, wherein the first weather video panel, the second weather video panel, and the third weather video panel present a current weather condition in a location.

5. The method of claim 4, wherein the current weather condition is obtained via a network from a weather application server system.

6. A non-transitory computer-readable medium comprising instructions that, when executed by a processor, perform a method for presenting weather data, the method comprising:
   displaying a first weather video panel comprising a first video element and a second weather video panel comprising a second video element, wherein the first video element comprises a first portion of an image showing a first condition, wherein the second video element comprises a second portion of the image showing a second condition, and wherein the first video element and the second video element are synchronized;
   receiving an instruction to add a third weather video panel;
   in response to receiving the instruction to add a third weather video panel:
      displaying the third weather video panel comprising a third video element, wherein the third video element comprises a third portion of the image showing a third condition; and
      restarting the first weather video panel and the second weather video panel, wherein after the restarting, the first video element, the second video element, and the third video element are synchronized.

7. The non-transitory computer-readable medium of claim 6, the method further comprising:
   receiving a request for a context-based weather report for a time period;
   obtaining an unfiltered weather report for the time period;
   determining a current location of the device;

obtaining historical weather data for the location and the time period;
determining an expected weather condition from the historical weather data; and
obtaining the context-based weather report for the time period by filtering out the expected weather condition from the unfiltered weather report.

8. The non-transitory computer-readable medium of claim 6, the method further comprising:
obtaining a first weather report from a first source;
obtaining a second weather report from a second source;
determining a report discrepancy based on a comparison between the first weather report and the second weather report; and
present an alert comprising the report discrepancy.

9. The non-transitory computer-readable of claim 6, wherein the first weather video panel, the second weather video panel, and the third weather video panel present a current weather condition in a location.

10. The non-transitory computer-readable of claim 6, wherein the current weather condition is obtained via a network from a weather application server system.

11. A method for presenting an image comprising:
receiving an instruction to display the image;
generating, by a computer processor, a first virtual tile and a second virtual tile from the image, wherein the first virtual tile and the second virtual tile are contiguous portions of the image, and wherein the first virtual tile and the second virtual tile share an edge;
initiating, by the computer processor, a first image bleeding from a first non-edge location on the first virtual tile, wherein the first image bleeding bleeds a first portion of the image onto the first virtual tile;
determining a future time target at which the first image bleeding will reach an edge location on the first virtual tile;
initiating, by the computer processor, a second image bleeding from a second non-edge location on the second virtual tile, wherein the second image bleeding bleeds a second portion of the image onto the second virtual tile, and wherein the second image bleeding is initiated to reach a corresponding edge location on the second virtual tile at the future time target.

12. The method of claim 11, further comprising:
receiving a request for a context-based weather report for a time period;
obtaining an unfiltered weather report for the time period;
determining a current location of the device;
obtaining historical weather data for the location and the time period;
determining an expected weather condition from the historical weather data; and
obtaining the context-based weather report for the time period by filtering out the expected weather condition from the unfiltered weather report.

13. The method of claim 12, wherein device comprises device location module, and wherein the currently location of the device is determined using the device location module.

14. The method of claim 11, further comprising:
obtaining a first weather report from a first source;
obtaining a second weather report from a second source;
determining a report discrepancy based on a comparison between the first weather report and the second weather report; and
presenting an alert comprising the report discrepancy.

15. The method of claim 11, wherein the edge location is a location on a shared edge between the first virtual tile and the second virtual tile nearest to the first non-edge location.

16. A non-transitory computer-readable medium comprising instructions that, when executed by a processor, perform a method for presenting weather data, the method comprising:
receiving an instruction to display the image;
generating a first virtual tile and a second virtual tile from the image, wherein the first virtual tile and the second virtual tile are contiguous portions of the image, and wherein the first virtual tile and the second virtual tile share an edge;
initiating a first image bleeding from a first non-edge location on the first virtual tile, wherein the first image bleeding bleeds a first portion of the image onto the first virtual tile;
determining a future time target at which the first image bleeding will reach an edge location on the first virtual tile;
initiating a second image bleeding from a second non-edge location on the second virtual tile, wherein the second image bleeding bleeds a second portion of the image onto the second virtual tile, and wherein the second image bleeding is initiated to reach a corresponding edge location on the second virtual tile at the future time target.

17. The non-transitory computer-readable medium of claim 16, the method further comprising:
receiving a request for a context-based weather report for a time period;
obtaining an unfiltered weather report for the time period;
determining a current location of the device;
obtaining historical weather data for the location and the time period;
determining an expected weather condition from the historical weather data; and
obtaining the context-based weather report for the time period by filtering out the expected weather condition from the unfiltered weather report.

18. The non-transitory computer-readable medium of claim 17, wherein device comprises device location module, and wherein the currently location of the device is determined using the device location module.

19. The non-transitory computer-readable medium of claim 16, the method further comprising:
obtaining a first weather report from a first source;
obtaining a second weather report from a second source;
determining a report discrepancy based on a comparison between the first weather report and the second weather report; and
presenting an alert comprising the report discrepancy.

20. The non-transitory computer-readable medium of claim 16, wherein the edge location is a location on a shared edge between the first virtual tile and the second virtual tile nearest to the first non-edge location.

* * * * *